United States Patent Office 2,806,013
Patented Sept. 10, 1957

2,806,013

PHENOLIC RESIN AND METHOD OF MAKING SAME

Martin P. Seidel, Sharon, Pa., assignor to Westinghouse Electric Corporation, East Pittsburgh, Pa., a corporation of Pennsylvania No Drawing. Application December 21, 1953, Serial No. 399,579

8 Claims. (Cl. 260—43)

This invention relates to a novel phenolic resin and method of making the same.

The primary raw materials which form the basis for the major production of phenolic resins in industry are phenol or cresylic acid, and formaldehyde. Of these chemicals only the cresylic acid fails to have definite chemical identity in that it is a mixture of phenol, cresols, xylenols, and, frequently, organic nitrogen and sulfur compounds. It is well known that the particular composition of the cresylic acid used to make a resin has a profound influence on the physical, chemical, and electrical properties of the resin. Some of these effects are so subtle that resin manufacturers generally purchase cresylic acid from selected coal tar distillers in the hope that the distillers can maintain nearly the same composition of their product by uniform processing.

The development and widespread use of solvent refining processes in the petroleum industry has made available substantial quantities of various grades of petroleum derived cresylic acids. The petroleum base cresylic acids in general contain roughly the same chemical compounds that the coal tar acids do, however, the relative concentration of given compounds in the two acids varies widely. The petroleum base cresylic acids contain less than 35% by weight of readily reactive phenols whereas the average coal tar base cresylic acids contain at least 45% by weight of readily reactive phenols. Thus petroleum cresylic acids are far less reactive than the coal tar acids. For this reason techniques which can be successfully employed to make resins from coal tar cresylic acids are of little or no value when petroleum base cresylic acids are used as raw materials. Many attempts have been made to use cheaper, less reactive petroleum base cresylic acids in the phenolics resin industry but the resins have been unsatisfactory due to their slow gelation and curing under practical treating and laminating conditions. A further disadvantage upon their use in the production of phenolic resins occurs during the later condensation stage of the reaction because resins derived from petroleum cresylic acids tenaciously retain a significant water content which causes the charge to become extremely viscous and sticky. This condition makes efficient heat transfer through the charge very difficult and, consequently, results in serious "burning" of the resin on the sides of the reaction vessel.

An object of this invention is to provide a method of making a phenolic resin by modifying a cresylic acid having a composition relatively low in readily reactive phenols with a phenol aldehyde resin having a higher order of reactivity.

A further object of this invention is to provide a mixed phenol aldehyde resin, one phenol being cresylic acid derived from petroleum and having a composition relatively low in readily reactive phenols, and being modified with a more reactive phenol.

A still further object of this invention is to provide a molded article of manufacture comprising fibrous material impregnated with phenolic resin comprising a phenol-aldehyde resin having readily reactive hydrogen atoms modified with a cresylic acid having a composition low in readily reactive phenols.

Other objects of the invention will, in part, be obvious and will, in part, appear hereinafter.

For a better understanding of the nature and objects of the invention reference should be had to the following detailed description.

I have discovered a method for making a highly useful phenolic resin from a cresylic acid containing less than 35% by weight of phenols having two readily reactive hydrogen atoms. A phenolic resin is produced that is cheaper in cost and equal to or better in physical and electrical properties than the phenolic resins produced from the coal tar base cresylic acids containing at least 45% by weight of readily reactive phenols used heretofore. In preparing the phenolic resin of this invention, first, a low viscosity phenol-formaldehyde resin made from a high reactivity phenol is prepared; and secondly, after allowing this liquid phenol-formaldehyde resin to cool, the following ingredients are reacted therewith by refluxing for 30 minutes or more: (1) a petroleum cresylic acid having a lower order of reactivity, (2) paraformaldehyde, and (3) a strongly basic catalyst such as a tetra substituted ammonium hydroxide. This mixture is then vacuum dehydrated. The chemical ingredients 1, 2 and 3 may be admixed with the initial phenol-formaldehyde resin in any desired order.

It is important when making the resins of this invention to employ the specific reactants and to follow the procedure as outlined above. If all of the materials are simultaneously charged, the gel time of the resulting resins increases to 40 minutes or more, which is excessive for commercial work. The substitution of aqueous formaldehyde for the paraformaldehyde in the second stage also increases the gel time markedly. The use of a weaker catalyst such as ethylene diamine in the second stage of the reaction instead of the strongly basic tetra substituted ammonia hydroxide produces a long gel time resin. The use of the tetra substituted ammonium hydroxide in the initial condensation may cause premature gelation. These comments emphasize the importance of a proper addition sequence in making the resins of this invention, although changes in the ratios of reactants can be resorted to in order to alter the properties in the final resin as desired.

In preparing the resins of this invention it is possible to vary the ratios of ingredients to form a resin comprising from 20 to 50% by weight of the initially prepared more reactive phenolformaldehyde polymer. For most purposes, however, 2 moles of low reactivity cresylic acid to 1 mole of the more reactive phenol has given excellent resins. The ratio of moles of paraformaldehyde to moles of petroleum cresylic acid may be varied from 1.05 to 1.25

The low reactivity cresylic acids used in this invention may be derived from any suitable source, but the petroleum industry appears to have a more abundant supply. It is to be understood, however, that low reactivity coal tar base cresylic acids may be employed with equal success. Generally, the coal tar base cresylic acids of low reactivity are obtained from a cresylic acid from which the readily reactive phenols have been stripped. It is possible with this invention to use cresylic acids which contain no readily reactive phenols. The phenols considered to be readily reactive, that is having two readily reactive hydrogen atoms, are phenol, m-cresol, 3,5-xylenol, 3-ethyl phenol and perhaps some of the $C_9$ phenols. Generally, the coal tar base cresylic acids found in commerce have an average of at least 45% by weight readily reactive phenols.

The gelation speed of the resins of this invention is controlled in part by the amount of catalyst used to condense the initially prepared more reactive phenol-formaldehyde polymer as well as the amount of strongly basic catalyst used to condense the low reactivity cresylic acid and paraformaldehyde. The amount of catalyst used in the initial phenol-formaldehyde condensation must be limited so as to prevent the resin from gelling. Substantially 0.05 to 2% by weight of ethylene diamine, based on the weight of the phenol, for example, 0.04 mole of ethylene diamine per 8.0 moles of phenol has been found to give good results in the initial condensation. For the second stage, the amount of strongly basic tetra substituted ammonium hydroxide catalyst is provided in an amount of from 0.25 to 1.0 mole percent, based on the moles of cresylic acid. In calculating the moles of cresylic acid, it was assumed that a formula weight of 118 was an average value.

Suitable tetra substituted ammonium hydroxide catalysts readily available to the trade are alkyl or aryl substituted ammonium hydroxides such as tetraethanol ammonium hydroxide, trimethyl beta hydroxyethyl ammonium hydroxide, trimethyl benzyl ammonium hydroxide, tetramethyl ammonium hydroxide and the like.

Example 1

The following is illustrative of the preparation of a readily reactive phenolic resin for use in this invention:

| | Moles |
|---|---|
| Phenol (85.5%) 880 g | 8.0 |
| Formalin (37.5%) 810 g | 10.1 |
| Ethylene diamine (78%) 3.5 g | 0.0455 |

The above chemicals were charged into an electrically heated mechanically stirred all glass reaction vessel and refluxed for 90 minutes. The mixture was allowed to cool to room temperature and the water layer that formed was decanted off, leaving a solvent soluble resinous reaction product.

For a more detailed description of the preparation of suitable readily reactive phenol-formaldehyde resins, reference should be had to the patent to Joseph J. Wachter, Patent No. 2,482,525, issued September 20, 1949, assigned to the same assignee as this invention.

The phenol-aldehyde resinous reaction product prepared above was used in the formulation of the following resin:

| | Grams |
|---|---|
| Phenol-formaldehyde reaction product | 110 |
| Cresylic acid having composition containing 30.8% by weight phenols having 2 readily reactive hydrogen atoms | 216 |
| Paraformaldehyde | 73.5 |
| Tetraethanol-ammonium hydroxide (40%) | 9.8 |

The above ingredients were charged into a reaction vessel and refluxed for one hour and then vacuum dehydrated to 28 inches of Hg to 110° C. Then 275 grams of ethanol were added to the resin to form a varnish which had a gelation time of 15 minutes. Gelation time as used herein is defined as the time required to solidify a 20 gram sample at 150° C.

Example 2

A varnish was prepared in the same manner as in Example 1 except that 12 grams of tetramethyl ammonium hydroxide was used as a catalyst. This varnish had a gel time of 14 minutes.

Example 3

A varnish was prepared in the same manner as in Example 1 except that 14 grams of trimethyl beta hydroxyethyl ammonium hydroxide was used as a catalyst. This varnish had a gel time of 18.3 minutes.

Example 4

A varnish was prepared in the same manner as in Example 1 except that 35 grams of trimethyl benzyl ammonium hydroxide was used. This varnish had a gel time of 13.8 minutes.

These varnishes were used to impregnate alpha cellulose paper to apply thereto sufficient resin solids equalling approximately 50% by weight of the paper. A plurality of the impregnated sheets of paper were superimposed in a stack and molded under heat and pressure to form a laminated body. All volatile constituents in the body were removed by opportune pressure release of the stack in the initial reaction which occurs during curing of the resin while molding under heat and pressure.

The following table is illustrative of the electrical properties of the laminated bodies that were prepared:

TESTED AT 25° C.

| | Percent Resin | 100 tan delta | | | Dielectric Constant | | |
|---|---|---|---|---|---|---|---|
| Frequency cycles per second | | $10^2$ | $10^3$ | $10^6$ | $10^2$ | $10^3$ | $10^6$ |
| Varnish—Example 3 | 43.5 | 4.51 | 2.74 | 3.42 | 5.46 | 5.21 | 4.71 |
| Varnish—Example 4 | 53 | 3.42 | 2.10 | 3.24 | 5.22 | 5.04 | 4.59 |
| Standard coal tar base cresylic acid-formaldehyde varnish containing over 48% readily reactive phenols | 50 | 6.10 | 3.60 | 3.85 | 5.46 | 5.15 | 4.15 |

These data indicate that the electrical properties of phenol-aldehyde modified cresylic acid-aldehyde resins are comparable to standard cresylic acid-aldehyde resins in current industrial usage.

Since certain obvious changes may be made in the specification, and different embodiments of the invention may be made without departing from the spirit and scope thereof, it is intended that all matter contained in the foregoing description shall be interpreted as illustrative and not in a limiting sense.

I claim as my invention:

1. In the method of making a mixed phenol-aldehyde resin, the steps comprising admixing with a solvent soluble, potentially reactive, alkali catalyzed phenol-aldehyde polymer, (1) a cresylic acid containing less than 35% by weight of phenols with two readily reactive hydrogen atoms, (2) paraformaldehyde, and (3) a tetra substituted ammonium hydroxide catalyst in which the substituents are selected from the class consisting of alkyl groups and aryl groups, the ratio of paraformaldehyde to cresylic acid being from 1.05 to 1.25 moles of paraformaldehyde per mole of cresylic acid, the amount of cresylic acid and paraformaldehyde being sufficient to provide a modified resin comprising from 20 to 50% by weight liquid phenol-aldehyde polymer.

2. The method of claim 1 in which the tetra substituted ammonium hydroxide catalyst is provided in an amount from 0.25 to 1.0 mole percent based on the moles of cresylic acid.

3. The method of claim 1 in which the tetra substituted ammonium hydroxide catalyst is tetramethyl ammonium hydroxide.

4. The method of claim 1 in which the tetra substituted ammonium hydroxide catalyst is tetraethanol ammonium hydroxide.

5. The method of claim 1 in which the tetra substituted ammonium hydroxide catalyst is trimethyl beta hydroxyethyl ammonium hydroxide.

6. The method of claim 1 in which the tetra substituted ammonium hydroxide catalyst is trimethyl benzyl ammonium hydroxide.

7. A phenol-aldehyde modified cresylic acid-aldehyde resin comprising the reaction product obtained by reacting from 20 to 50% by weight phenol-aldehyde polymer and from 80 to 50% by weight cresylic acid and paraformaldehyde in the presence of a tetra substituted ammonium hydroxide catalyst in which the substituents are selected from the class consisting of alkyl groups and aryl groups, the cresylic acid containing less than 35% by weight of phenols with two readily reactive hydrogen atoms, and the ratio of paraformaldehyde to cresylic acid being 1.05 to 1.25 moles of paraformaldehyde per mole of cresylic acid.

8. An article of manufacture comprising fibrous material impregnated with the resin of claim 7, the fibrous material being bonded together by curing the resin to its final solid infusible stage by heat and pressure to form a consolidated unitary body.

References Cited in the file of this patent

UNITED STATES PATENTS

| | | |
|---|---|---|
| 2,043,992 | Ellis | June 16, 1936 |
| 2,164,326 | Harvey | July 4, 1939 |
| 2,485,527 | Cardwell | Oct. 18, 1949 |

FOREIGN PATENTS

| | | |
|---|---|---|
| 633,416 | Great Britain | Dec. 19, 1949 |
| 731,900 | Germany | Feb. 17, 1943 |